United States Patent
Obermeier et al.

(10) Patent No.: US 10,187,411 B2
(45) Date of Patent: Jan. 22, 2019

(54) METHOD FOR INTRUSION DETECTION IN INDUSTRIAL AUTOMATION AND CONTROL SYSTEM

(71) Applicant: ABB Schweiz AG, Baden (CH)

(72) Inventors: Sebastian Obermeier, Schinznach-Dorf (CH); Roman Schlegel, Wettingen (CH); Michael Wahler, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/945,692

(22) Filed: Nov. 19, 2015

(65) Prior Publication Data

US 2016/0149944 A1    May 26, 2016

(30) Foreign Application Priority Data

Nov. 21, 2014   (EP) .................................. 14194321

(51) Int. Cl.
| | |
|---|---|
| *H04L 29/06* | (2006.01) |
| *G06F 9/54* | (2006.01) |
| *G06F 17/30* | (2006.01) |
| *G06F 21/55* | (2013.01) |
| *H04L 12/24* | (2006.01) |

(52) U.S. Cl.
CPC .......... *H04L 63/1425* (2013.01); *G06F 9/542* (2013.01); *G06F 17/30345* (2013.01); *H04L 63/1416* (2013.01); *G05B 2219/23317* (2013.01); *G06F 21/554* (2013.01); *H04L 41/145* (2013.01)

(58) Field of Classification Search
CPC .................................................. H04L 63/1416
USPC ............................................................ 726/23
See application file for complete search history.

(56) References Cited

U.S. PATENT DOCUMENTS

| | | | |
|---|---|---|---|
| 7,275,017 B2* | 9/2007 | Dini ........................ | H04L 41/16 702/182 |
| 7,689,455 B2* | 3/2010 | Fligler ............... | G06Q 10/0639 705/7.38 |
| 8,680,995 B2 | 3/2014 | G et al. | |
| 8,793,790 B2 | 7/2014 | Khurana et al. | |

(Continued)

FOREIGN PATENT DOCUMENTS

| | | |
|---|---|---|
| EP | 2749980 A1 | 7/2014 |
| WO | 2012085087 A1 | 6/2012 |

*Primary Examiner* — Khalil Naghdali
(74) *Attorney, Agent, or Firm* — Whitmyer IP Group LLC

(57) ABSTRACT

A method and system for automatic signalling an alert when a possible intrusion occurs in an industrial automation and control system, based on security events which occur in the industrial automation and control system or are externally fed into the system. The method includes the steps of: (a) determining a correlation of a first and second security event and storing the correlation in an event database, wherein the correlation includes a probability that the first security event is followed by the second security event within a normalized time period, (b) identifying a candidate event as the first security event, based on event information of the candidate event, upon occurrence of the candidate event, (c) classifying the candidate event as anomalous when the probability exceeds a predetermined threshold and no second security event follows the candidate event within the normalized time period, and (d) signalling the alert indicating the candidate event.

10 Claims, 1 Drawing Sheet

(56) References Cited

U.S. PATENT DOCUMENTS

| | | | |
|---|---|---|---|
| 8,941,484 B2* | 1/2015 | Vacha | G08B 25/008 |
| | | | 340/517 |
| 9,239,887 B2* | 1/2016 | Johnston | H04L 41/069 |
| 2016/0337161 A1* | 11/2016 | Huibers | H04L 29/06333 |

* cited by examiner

METHOD FOR INTRUSION DETECTION IN INDUSTRIAL AUTOMATION AND CONTROL SYSTEM

FIELD OF THE INVENTION

The invention relates to the field of cyber security in the industrial automation and control system (IACS), in particular, to a method and a system for automatic signalling of a possible intrusion, thereby simplifying intrusion detection.

BACKGROUND OF THE INVENTION

In order to identify cyber security related attacks in the the industrial automation and control system, there are components that signal security relevant alarms and events such as failed and successful log-in attempts, password changes, or firmware updates.

Detecting attacks solely from information retrieved from network traffic and IACS components may be sufficient to detect ongoing cyber-attacks. However, in order to detect suspicious activities early on, additional information has to be taken into account, e.g., events generated from card access systems, vacation plans, or presence sensors.

WO 2012/085087 describes an intrusion detection system for an IACS that takes into account context information representative of conditions or constellations beyond the limits of the IACS. The context information includes shift plans describing which work-force individuals should be active on the system, information from the physical access control describing which individuals have local access to different parts of the system and which individuals are physically present where in the system is, approved work orders describing which individuals have permission to perform which functions in the system or configuration switches that describe different use scenarios the system may be in and for which rule sets should be applied.

However, for implementing such a conventional intrusion detection system, significant amount of configuration overhead can be required for engineering the system. As the configuration of the intrusion detection system also depends on devices and software provided by several different vendors, the individual components accessed by the intrusion detection system can vary. The resulting configuration time required to semantically identify and label security events therefore becomes prohibitive.

DESCRIPTION OF THE INVENTION

It is therefore an objective of the invention to simplify the assistance for detection of security events as intrusions, where the security events may occur in different security devices and systems and do not have a common identifier or representation format. This objective is achieved by a method and a device according to the independent claims. Preferred embodiments are evident from the dependent claims.

The present invention provides a method for automatic signalling an alert when a possible intrusion occurs in an industrial automation and control system, based on security events which occur in the industrial automation and control system or are externally fed into the system. The method comprises steps of: (a) determining a correlation of a first security event and a second security event and storing the correlation in an event database, wherein the correlation includes a probability that the first security event is followed by the second security event within a normalised time period, (b) identifying a candidate event as the first security event, based on event information of the candidate event, upon occurrence of the candidate event, (c) classifying the candidate event as anomalous when the probability exceeds a predetermined threshold and no second security event follows the candidate event within the normalised time period, and (d) signalling the alert indicating the candidate event.

According to another aspect, the present invention provides a system for automatic signalling an alert when a possible intrusion occurs in an industrial automation and control system, based on security events which occur in the industrial automation and control system or are externally fed into the system. The system comprises an event collector that can determine a correlation of a first security event and a second security event, and an event database that can store the correlation, wherein the correlation includes a probability that the first security event is followed by the second security event within a normalised time period. The system further comprises an analysis module that can identify a candidate event as the first security event, based on event information of the candidate event, upon occurrence of the candidate event. The system is adapted to classify the candidate event as anomalous when the probability exceeds a predetermined threshold and no second security event follows the candidate event within the normalised time period, and to signal the alert indicating the candidate event.

In an exemplary embodiment, the correlation of the first security event and the second security event can be accumulated when the first and second security events occur repeatedly. The accumulated correlation can be then updated in the event database.

In an exemplary embodiment, the predetermined threshold is 0.8, or can be 0.9. The probability can be a distributed probability, e.g. it increases with elapsed time since the occurrence of the first security event.

In an exemplary embodiment, the event information comprises a provider identification ID and an event identification ID. The provider ID can be in form of a code that describes a certain security component, such as a door entry system or a control system for user access to a computer, while the event ID can be in form of a return code that describes the event status, such as door entry successful or computer login successful.

The present invention also relates to a computer program product including computer program code for controlling one or more processors of the above described method and system, particularly, a computer program product including a computer readable medium containing therein the computer program code.

The present invention enables automatic generation of patterns or correlations for occurring security events, in particular the frequently occurring security events, in an industrial system, without requiring semantic information about the received events. The technique utilises machine learning and may require an initial learning phase.

Based on these patterns or correlations, the present invention can analyse a security event that currently occurs and classify if this event may be considers as a possible intrusion.

Although the system learns and can therefore be susceptible to false positives, e.g., in abnormal or emergency situations, it is not a problem because the output of the system is only informative. That is, it does not automatically take action based on the recognized abnormality, it only provides indications to an operator that a security-related situation has not occurred before, which means there is a possible intrusion and the operator should check that. In other words, the present invention enables an automatic signalling of a possible intrusion that can be then verified by the operator, thereby assisting or simplifying the intrusion detection.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
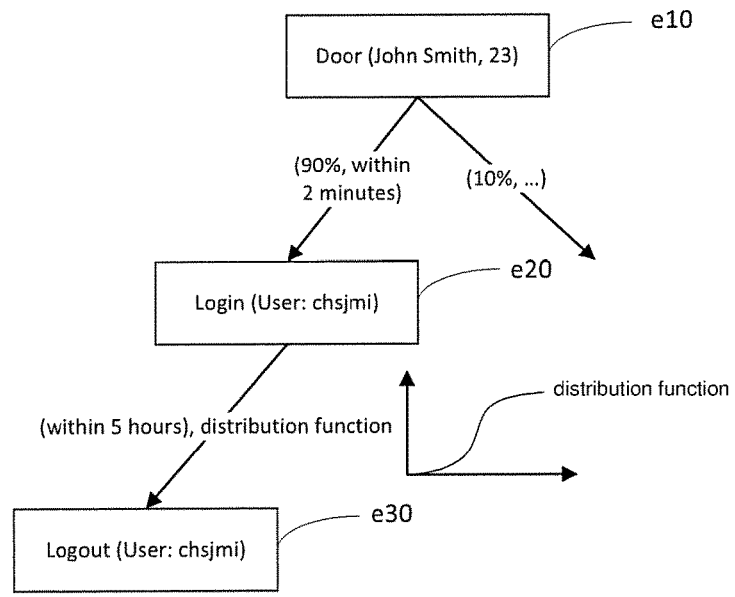
FIG. 1 schematically shows the correlations of several security events happening in the past, where the correlations are identified and stored in the event database, according to the present invention.

The present invention can recognize that an industrial automation and control system (IACS) has a different mixture of devices and systems that provide security events. These systems differ not only in how security events are represented, but also in the meaning of the individual fields of an event. In addition, each IACS may have different guidelines for naming devices, users and systems. Thus, it is infeasible for vendors to create intrusion detection rule sets that apply to every IACS without requiring major adaptation.

Therefore, the present invention avoids relying on a semantic definition of security events or on a common format. In contrast, it automatically establishes correlations between different security-related events and can recognize event patterns that have not been seen before. Table 1 below illustrate several exemplary security events that may occur in the ICSA:

TABLE 1

| Date/Time | Provider ID | Event ID | Event Info |
|---|---|---|---|
| 01-01-14, 10:32:34 | B98 | A323 | John Smith, 23 |
| 01-01-14, 10:34:21 | A2323 | E3423 | User: chjsmi |
| 01-01-14, 10:37:34 | R23 | VP23 | <Event><br>  <Account> chjsmi<br>  </Account><br>  <IP><br>  90.54.32.14</IP><br></Event> |
| 01-01-14, 11:41:34 | B99 | A324 | John Smith, 23 |

Without further analysis, correlating these events is a hard problem, as the meaning of the IDs for providers and events may be unclear as shown in Tables 2 and 3 below.

TABLE 2

| Provider ID | Description |
|---|---|
| B98 | Door-Entry System |
| A2323 | Control System |
| R23 | VPN Access |
| B99 | Door-Exit System |

TABLE 3

| Event ID | Description |
|---|---|
| A323 | Entry successful |
| E3423 | Login successful |
| VP23 | Login successful |
| A324 | Exit successful |

As shown the format of the event info field differs between different security event providers. To get an understanding of what has happened, a computer system would have to know the semantic meaning of each event info field, translate them into a common format, correlate them and run analytics with pre-defined rules. This can be a very time-consuming engineering task, especially if the providers of the security events are third-party devices.

A human, on the other hand, can in this example conclude that John Smith entered the building, accessed the control system and then logged into the VPN from the outside, which could indicate a security anomaly, or be perfectly fine, as he is preparing a mobile device for work in the field. To judge the relevance of such a situation in terms of security, it is important to compare this situation with the past and other everyday situations. The system will perform such an automated analysis of the occurrence of these events, including an analysis of the difference in the event info fields, e.g. the number of characters, etc.

The internal workings are, that the system takes a series of new security events, performs a query within the set of past data whether such series of events has occurred before in the same or slightly different form (e.g., using edit distance matching or other metrics), counts the number of found matches, and puts it into relation to the overall amount of data. If this relation is above a certain threshold, the series of events is considered as legitimate, otherwise it is considered anomalous.

FIG. 1 illustrates an exemplary embodiment of the present invention. The event e10 that John Smith entered the door was provided with event information "John Smith, 23". After John entered the door, he logged into the computer system. This event e20 happened 2 minutes after the event e10. These two events may occur very often consecutively, since John usually enters the door in order to login into the computer. Based on this information, the system according to the present invention can determine the probability, e.g. how certain is it that the event e20 will occur directly after event e10. For instance, in the exemplary embodiment, the probability is 90%. Further, the system according to the present invention can also evaluate a normalised time period, e.g. when John enters the door after what time he usually logs into the computer system. The normalised time can be the average of the times between the occurrence of events e10 and e20, e.g. 2 min. That is, when John enters the door, the probability that he logs into the computer system is 90% within 2 minutes.

After John logs into the computer system, he usually starts to work. For instance, it is unlikely he logs out e30 after only a couple of minutes. After several hours, John finishes his work and logs out from the computer system, e.g. likely after three hours, very likely four hours, and most likely five hours. Thus, the probability that he logs out may increase with lapsed time.

Based on the evaluation above, the correlations between event e10 and e20 as well as between e20 and e30 can be determined. Now, the system according to the present invention can be used for signalling a possible intrusion. For instance, when a person successfully enters the door as "John" and does not log into the computer system within 2 minutes, it is an indication of a possible intrusion, e.g. the person obtained the door access card and is in reality not authorised for entering the door. The system according to the present invention can now signal an alert to the security operators who can then inspect if there is something wrong. Thus, the present invention can assist the security operator for intrusion detection by automatic signalling an alert.

Figure 2:
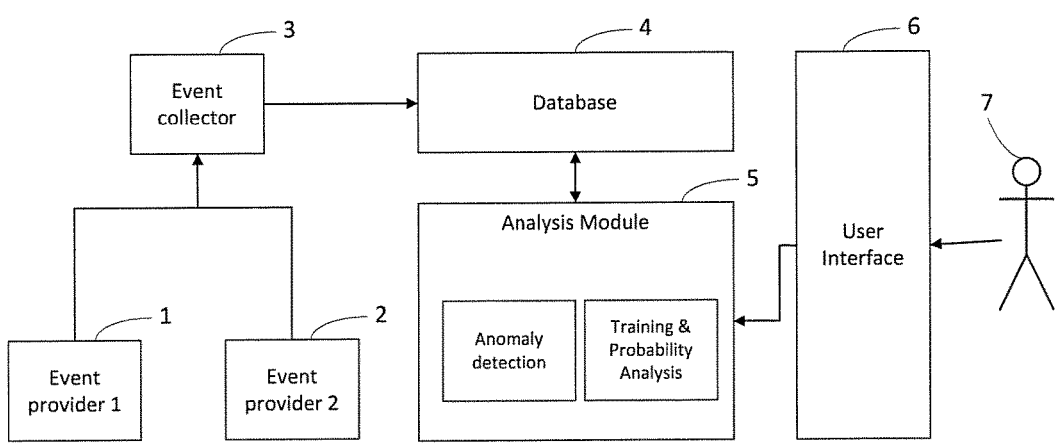
FIG. 2 schematically shows a system for signalling an alert according to the present invention, where the security events from two event providers are collected by the event collector, and the analysis module provides training and probability analysis as well as the anomaly detection.

FIG. 2 shows an exemplary embodiment of the system according to the present invention. An event provider 1 and 2 for initiating the event can be in form of embedded devices, security systems, or regular computers. An event collector module 3 collects these security events and stores them within a database 4. An analysis module 5 accesses the database, and performs a training and probability analysis on them. This data can be used for anomaly detection, i.e. whenever a pre-defined number of events have been newly inserted into the database, the anomaly detection can be performed. The user or security operator 7 can interact with the system through a user interface 6.

An exemplary training algorithm for determining probabilities according to the present invention can be used in the analysis module:

Firstly, for each unique security event E in a list of security events $L_e$, the overall occurrences of the event E can be determined, where each of these single occurrences can be referred to as $E_1, E_2 \ldots E_n$:

count, for each unique security event F that follows $E_1$ to $E_n$ within a user-specified time frame x, the number n of occurrences of F, if n is greater than a user-specified number, mark this event as a correlation, where the probability of this occurrences is computed by dividing the number of occurrences through the number of events $E_1, E_2 \ldots E_n$.

The result of the above algorithm can be, for each security events, a list of possible follow-up events with an associated probability. In order to determine an anomaly, the following anomaly detection algorithm can be executed:

identify a security event $E_v$ to be monitored, look up the follow-up events and the probabilities determined by the previous algorithms for each follow-up events $E_f$ that is above a certain user defined threshold probability, put $E_f$ into a list of follow-up events $L_f$, wait until another security event $E_{v1}$ is received or a timeout has passed, if $E_{v1}$ is in $L_f$, the algorithm is restarted with the event $E_{v1}$.

if timeout has passed and no security event has been received, signal an alert.

While the invention has been described in detail in the drawings and foregoing description, such description is to be considered illustrative or exemplary and not restrictive.

Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for automatic signalling an alert when a possible intrusion occurs in an industrial automation and control system, comprising:

connecting an event collector with multiple event providers distributed in the industrial automation and control system, the event providers transmitting security events to the event collector and being at least one of embedded devices, security systems, or computers, determining, via a processor of the event collector, a correlation of a first security event $E_1$ and a second security event $E_2$ without requiring semantic information about the first security event $E_1$ and the second security event $E_2$, and storing the correlation in an event database, wherein the correlation includes a probability $P_{E1,E2}$ that the first security event $E_1$ is directly followed by the second security event $E_2$ within a normalised time period, the normalised time period being an average time between occurrences of the first security event $E_1$ and the second security event $E_2$, identifying, via an analyzer having a processor for training and probability analysis, a candidate event as the first security event $E_1$, based on event information of the candidate event, upon occurrence of the candidate event, the analyzer being configured to access the event database, classifying the candidate event as anomalous when the probability $P_{E1,E2}$ exceeds a predetermined threshold and no second security event $E_2$ follows the candidate event within the normalised time period, and signalling the alert indicating that the candidate event is anomalous for inspection into whether an intrusion has occurred, wherein the method further comprises machine learning of the processor in the event collector by accumulating the correlation of the first security event $E_1$ and the second security event $E_2$ upon their re-occurrence, and updating the event database.

2. The method according to claim 1, wherein the predetermined threshold $P_{thres}$ is 0.8.

3. The method according to claim 1, wherein the probability $P_{E1,E2}$ is a distributed probability.

4. The method according to claim 1, wherein the probability $P_{E1,E2}$ increases with elapsed time since the occurrence of the first security event $E_1$.

5. The method according to claim 1, wherein the event information comprises a provider identification and an event identification.

6. An alert system for automatic signalling when a possible intrusion occurs in an industrial automation and control system, the alert system comprising:

an event collector configured to connect to multiple event providers distributed in the industrial automation and control system and having a processor to receive security events from the event providers, the event collector determining a correlation of a first security event $E_1$ and a second security event $E_2$ without requiring semantic information about the first security event $E_1$ and the second security event $E_2$, the event providers being at least one of embedded devices, security systems, or computers, an event database connected to the event collector, the event database storing the correlation upon being transmitted from the event collector, wherein the correlation includes a probability $P_{E1,E2}$ that the first security event $E_1$ is followed by the second security event $E_2$ within a normalised time period, the normalised time period being an average time between occurrences of the first security event $E_1$ and the second security event $E_2$, the processor of the event collector being configured for machine learning by accumulating the correlation of the first security event $E_1$ and the second security event $E_2$ upon their re-occurrence, and updating the event database, and an analyzer having a processor for training and probability analysis, the analyzer being configured to access the event database and retrieve the probability $P_{E1,E2}$, wherein the analyzer identifies a candidate event as the first security event $E_1$, based on event information of the candidate event, upon occurrence of the candidate event, the analyzer classifies the candidate event as anomalous when the probability $P_{E1,E2}$ exceeds a predetermined threshold and no second security event $E_2$ follows the candidate event within the normalised time period, and the analyzer signals the alert indicating that the candidate event is anomalous for inspection into whether an intrusion has occurred.

7. The system according to claim 6, wherein the predetermined threshold $P_{thres}$ is 0.8.

8. The system according to claim 6, wherein the probability $P_{E1,E2}$ is a distributed probability.

9. The system according to claim 6, wherein the probability $P_{E1,E2}$ increases with elapsed time since the occurrence of the first security event $E_1$.

10. The system according to claim 6, wherein the event information comprises a provider identification and an event identification.

\* \* \* \* \*